May 23, 1939.  K. MAYBACH  2,159,170
DEVICE FOR ACTUATING A CLUTCH AND A CHANGE SPEED GEAR IN AUTOMOBILES
Filed July 10, 1935  2 Sheets-Sheet 1
*Fig. 1.*
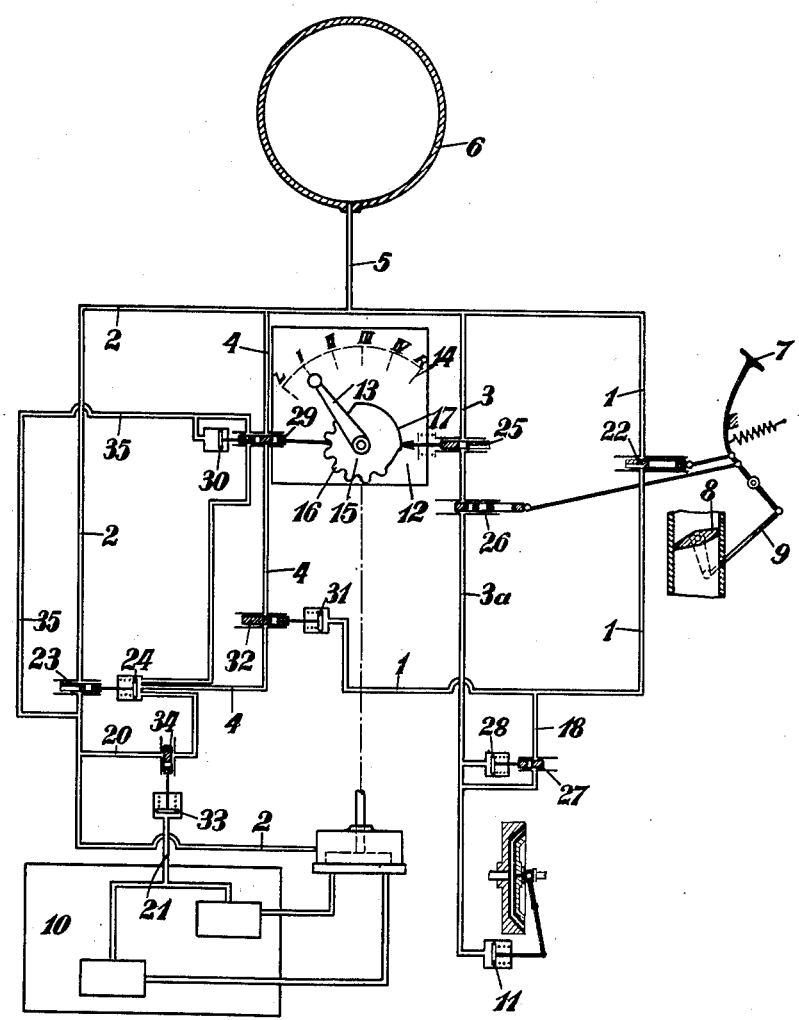
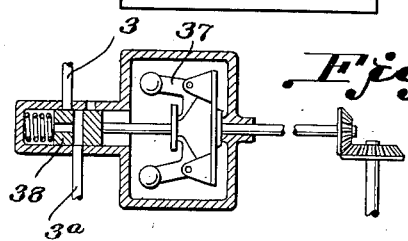
*Fig. 3.*
Inventor: Karl Maybach

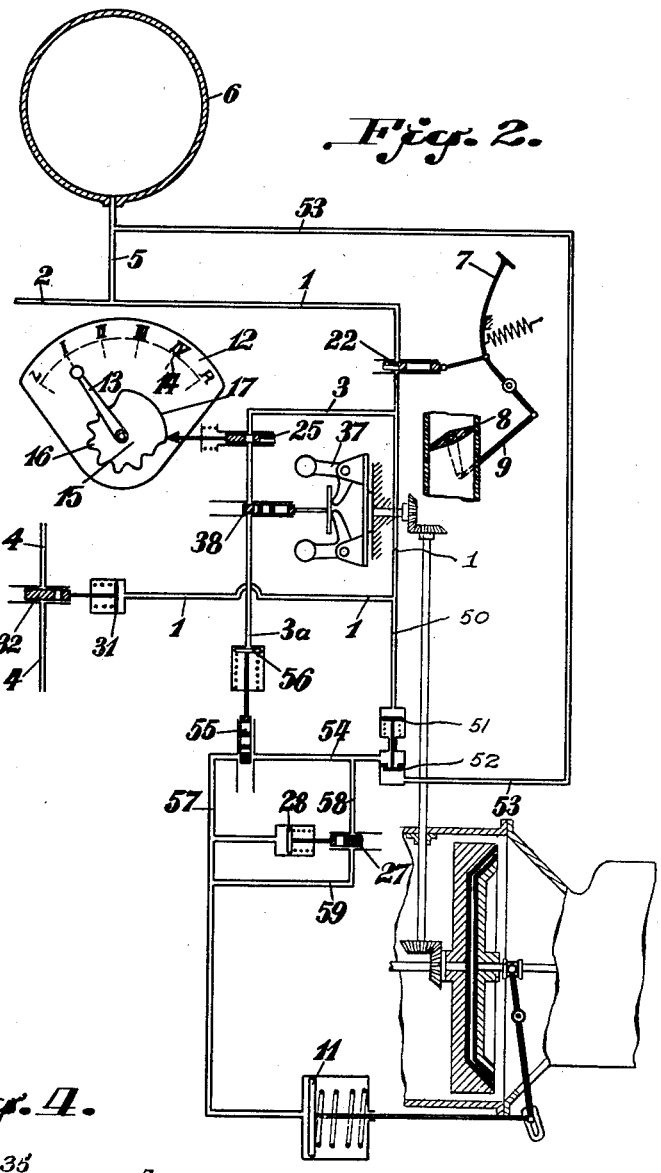

Patented May 23, 1939

2,159,170

UNITED STATES PATENT OFFICE 2,159,170

DEVICE FOR ACTUATING A CLUTCH AND A CHANGE SPEED GEAR IN AUTOMOBILES

Karl Maybach, Friedrichshafen, Germany, assignor to Maybach-Motorenbau G. m. b. H., Friedrichshafen, Germany Application July 10, 1935, Serial No. 30,759
In Germany August 8, 1934

22 Claims. (Cl. 192—.01)

My invention relates to a device operated by a pressure medium (more particularly a gaseous medium, for instance, pressure air or suction pressure), for actuating a clutch and a change gear of a power driven vehicle.

My invention more particularly relates to devices in which the pressure medium stream is divided into several branches.

The characteristic feature of the device according to my invention is the fact that the first branch of the pressure medium stream is controlled by a member dependent on a lever operated by the driver, such as the gas lever, and that the pressure medium flowing in this branch controls the opening of a stop valve in the second branch which releases the control pressure proper for engaging the desired speed of the change gear, and that, moreover, in a third branch of the pressure medium stream the degree of pressure of the pressure medium flowing therein is varied by a regulating member, and that this regulated pressure medium is used either directly or indirectly for exerting pressure upon the clutch on engagement.

The regulating member in the third pressure medium branch is preferably made dependent on the lever, and a stop member is provided in this branch which is maintained open when a gear speed has been set.

Moreover, according to the invention, a fourth branch of the pressure medium stream is controlled in dependence on the selection of the gear speed to be set, and this pressure medium is used for moving the stop member of the medium flowing in the second branch, which medium provides the control pressure. This fourth branch is preferably also controlled by the lever, and it may either be controlled directly by the lever or by the pressure medium flowing in the first branch which is controlled in dependence on the gas lever.

Preferably, the arrangement is so designed that the pressure medium acts in the device for disengaging and engaging the clutch, in the sense of engaging the clutch. By this means, it is attained that, should the pressure medium fail or should the pressure medium not yet have been supplemented, for instance, on starting the vehicle after a long standstill, the clutch will always be disengaged.

The device according to the invention enables the parts required for driving the vehicle to be handled in a simple and reliable manner, and consequently completely relieves the driver. The device results in a very rapid and absolutely positive completion of the various operations on starting and on setting various speeds, the driver having only to operate the gas lever. A clutch lever is no longer required as it is, in the device according to the invention, no longer needed either for starting or for setting speeds. The whole attention of the driver can therefore be directed to the guiding of the vehicle in the narrowest sense, that is, to steering and to regulation of the speed by manipulation of the gas lever and the brakes.

The advantages of the invention are particularly important in connection with large and heavy vehicles (omnibuses, railway motorcars and so on).

My invention is primarily employed in connection with change gears which are provided with claw clutches coming into engagement upon overrunning, as in connection with such gears the control of the gear speeds is already simplified to a very large extent.

In the further development of the invention, the degree of pressure of the pressure medium admitted to the clutch operating device is set directly or indirectly by a centrifugal governor, for instance, automatically in dependence on the number of revolutions of the driving motor. The engaging force is thereby brought into direct dependence on the number of revolutions of the driving motor, and the advantage results that the engaging force of the clutch is in this manner always automatically adapted to the existing drive resistances by which the number of revolutions of the driving motor is determined.

According to my invention, the pressure medium admitted to the control member of the centrifugal governor, is controlled by the pressure medium flowing in the first branch, or pressure medium is directly admitted to this control member from the first branch. This arrangement has the advantage that immediately after the return of the gas lever by the driver, not only will the first branch no longer receive pressure medium in known manner, but also the pressure medium branch which leads to the centrifugal governor and therefrom to the operating device of the clutch will receive no pressure medium. By this means, pressure medium losses at various points are avoided, more particularly during the drive of the vehicles in free run conditions.

Preferably, the pressure medium of the third pressure medium branch, in which the control member operated by the centrifugal governor is arranged, is not caused to act directly upon the operating device of the clutch, but the control member of the centrifugal governor is, for the purpose of increasing sensitivity, constructed to have only small control cross sections and a slight mass, and by the pressure medium controlled thereby, there is operated a control member which releases large cross sections (compared with those of the previously mentioned control member) and leads the pressure medium coming from the reservoir to the operating device of the clutch. By this means, a rapid and sensitive action is attained. In this case, in order to reduce further losses owing to lack of tightness during operation with returned gas lever, there is, moreover, operated a stop member for the pressure medium directly acting in the operating device of the clutch, preferably by the pressure medium flowing in the first pressure medium branch. By this means, any pressure medium loss is avoided after cutting off the gas, that is, when the clutch is disengaged.

Further details and advantages of my invention will be seen from the described diagrammatic constructional examples.

The device according to my invention is shown in Fig. 1 in a diagrammatic general representation of a constructional example.

Fig. 2 illustrates a second construction of the subject of my invention, also in diagrammatic partial representation.

Fig. 3 is a cross section showing on a larger scale the centrifugal governor 37 and valve 38.

Fig. 4, also in cross section and on a larger scale shows piston 30 and valve 29.

The various branches of the pressure medium stream are indicated by 1 to 4. They branch off from the main conduit 5 which is connected to the pressure medium container 6. 7 is the gas lever which moves the throttle valve 8 by means of the rod 9. 10 indicates the change gear with the control and setting members operating the various transmissions, 11 the clutch with the corresponding operating device. 12 is the speed selector, the hand lever 13 of which is set over a scale 14 for the various gear speeds indicated by I to IV as well as backward drive R. With the hand lever 13 is connected a disc 15 which, on the one hand, possesses cam teeth 16 and, on the other hand, a single cam 17.

18 is a subsidiary branch branched off branch 1, 20 a subsidiary branch branched off branch 2. 21 is a branch starting from a pressure conduit at the gear.

In the branch 1 is provided a closing member 22 connected with the gas lever 7, which member is so constructed that it allows the pressure medium to flow through the conduit branch 1 in all positions of the gas lever with the exception of the rest position. The passage through the pressure medium branch 2 which passes the control pressure to the gear, is made free by the control member 23 which is moved by the pressure passed by the branch 4 to its operating member 24.

The control member 25 which controls the passage through the pressure medium branch 3, is held in the open position in all speed positions by the cam 17. The regulating member 26 regulates the pressure in the portion 3a of the conduit 3 in such a manner that the pressure in the conduit 3a is increased the more the gas lever is depressed. This pressure acts also upon the operating member 28 of the control member 27, which latter is arranged in the branch conduit 18 branching off conduit 1.

By the cam teeth 16 arranged upon the cam disc 15, is moved a control member 29 which is arranged in the branch conduit 4. The pressure medium flowing in the conduit 1 is passed to the operating member 31 of a control member 32 arranged in the branch conduit 4. Also, the conduit 20 branched off the conduit 2 leads to the operating member 24 and is controlled by a control member 34 operated by means of member 33 by the pressure medium in the conduit 21. From the conduit 2 branches off behind the control member 23, a subsidiary conduit 35 which leads to the operating member 30 of the control member 29, and, moreover, leads through control member 29 to the operating member 24.

The mode of operation of the device shown in Fig. 1 is the following:

The pressure medium acts in the disengaging and engaging device 11 of the clutch in the engaging sense. On starting the vehicle from a long standstill, the clutch is therefore without any manipulation disengaged, if there is no longer any pressure medium in the conduit system, even if the speed selector should not be set for idle run. The driver starts the motor. Thereby, the container 6 and the adjacent conduits are filled with pressure air. In the idle run position of the speed selector, the control member 25 stops the passage through the conduit 3. Starting occurs in the position of the first speed. In this position, as well as in all other speed positions, the control member 25 is displaced by the cam 17 into the opened position so that there is pressure air in the conduit 3 up to the control member 26. During the movement of the speed selector lever from the idle run position into the position of the first speed, the control member 29 was lifted by the corresponding cam tooth 16, and pressure air was thereby passed into the portion of the conduit 4 lying behind 29.

If now, the driver moves the gas lever from the rest position shown in the drawings, then, after a very small movement, the control member 22 will render free the passage through the conduit 1. By the pressure acting upon the operating member 31, the control member 32 will be displaced into its left position, rendering for a short time free the passage through the conduit 4 to the operating member 24, so that the pressure of the pressure medium from conduit 4 rendered free by the control member 29, acts upon the operating member 24 and thereby the control member 23 renders free the passage through the conduit 2 and by this means, the transmission required for the first speed, is set in the gear. The members required for this purpose are not illustrated in detail as they may be of known construction.

As soon as the control pressure has been rendered free by the control member 23, the pressure also acts through conduit 35 upon the operating member 30 of the control member 29 and slides the latter back into its initial position. During such movement of member 29 the left hand passage therein momentarily opens conduit 35, and a pressure impulse is transmitted through the latter to hold members 24 and 23 in their left hand positions. A third pressure impulse may be transmitted to member 24 to hold member 23 open through pressure from line 2 transmitted through conduit 20 to member 24 when control member 34 is open. This latter arrangement is particularly provided for gears with overrun claw clutches, the teeth of which are so inclined that on engagement, the movable clutch half is repelled until the originally slower clutch half overruns the other half, and in which auxiliary devices are provided for retarding or accelerating one clutch half, as disclosed for example in my United States Patents 1,883,743 and 1,891,698. With such gears, the conduit 21 is connected to a conduit of the corresponding auxiliary device conveying the controlled pressure medium. In this manner, the control member 34 is, during the mentioned repelling condition, held open by the control pressure and that the latter acts upon the operating member 24 so long as the engagement movement lasts, and that on the contrary, this action ceases and consequently the control member 23 is closed as soon as the corresponding transmission is engaged.

On returning the gas lever 7 to the rest position, the pressure in the conduit 1 disappears as the control member 22 is moved into its closing position. The regulating member 26 also reaches its end position in which it does not allow any pressure or only a very small pressure to pass to the operating device of the clutch, so that the clutch is disengaged.

The setting of a speed after its suitable selection, occurs also on returning the gas lever, as, in this case, the control member 32 is moved, owing to the disappearing pressure in the conduit 1, into its right-hand end position, and the control member 23 is thereby displaced by the operating member 24 into the position rendering free the passage through the conduit 2, so that the described control operations will occur in the same manner. With the movement of the gas pedal lever from the rest position, the slide 26 is also displaced accordingly and thereby produces more or less high pressure in the conduit branch 3a leading to the operating device 11 of the clutch. After a certain time interval, or as soon as this pressure has reached a certain level, the pressure so acts upon the operating member 28 that the control member 27 connected therewith is displaced in the branch conduit 18 branched off the conduit 1 and thereby renders free the passage of the full pressure of the pressure medium coming from the conduit 1. The clutch is therefore now engaged with the full pressure. This pressure consequently also acts in the conduit 3a and holds, by means of the operating member 28, the control member 27 in its open position.

In Fig. 2, in addition to the designations mentioned in Fig. 1, 37 indicates a centrifugal force governor which moves the control member 38 for the pressure medium flowing in the pressure medium branch 3. From the pressure medium branch 1 is branched off a conduit 50 by which is moved an operating member 51 and through the latter a stop valve 52 which renders free the admission from a pressure medium conduit 53 coming direct from the reservoir 6. From the casing of the stop valve 52 the pressure medium is conveyed by a conduit 54 to a regulating slide 55 which is moved by the piston 56. Upon the latter acts the pressure medium admitted through the conduit 3a coming from the regulating member 38 of the centrifugal force governor 37. From the regulating member 55 leads the pressure medium conduit 57 to the operating device 11 of the clutch.

From the conduit 54 is branched off a conduit 58 which leads to the control member 27 also shown in Fig. 1. This is connected by conduit 59 to conduit 57.

The mode of operation of the device shown in Fig. 2 is the following:

When the driver moves the gas lever 7 from the rest position shown in the drawings, whilst, as described in the previous constructional example, after moving a short distance, the pressure medium flow in the conduit 1 is rendered free by the control member 22, the control member 32 is immediately moved by the piston 31 into its other end position and therewith the two parts of pressure branch 4 lying in front and behind the control member 32 are connected together for a short time whereby setting of a speed of the change gear is always possible at the will of the driver. Simultaneously, the piston 51 is, by the pressure medium which passes into the conduit portion 50, connected to the conduit 1, displaced downwardly, and the stop valve 52 is opened thereby so that from the conduit 53 pressure medium can enter the conduits 54 and 58. The conduit 58 is, however, for a while still closed by the control member 27.

Immediately after the opening of the control member 22, pressure medium also passes into the conduit 3. So long as the lever 13 of the speed selector is in the idle run position, the control member 25 is closed. If, however, this lever is moved into the position of the first speed, the control member 25 is under the action of the cam 17 in the open position and renders free the pressure medium passage through the conduit 3 to the control member 38 of the centrifugal force regulator 37. By the control member 38, the degree of pressure of the pressure medium is now regulated in dependence on the number of revolutions of the centrifugal force governor 37. This regulated pressure passes through the conduit 3a above the piston 56 and displaces the regulating member 55 in accordance with the number of revolutions of the driving motor more or less in the downward direction. The pressure medium admitted by the conduit 54 to the control member 55 is thereby also regulated in dependence on the number of revolutions, and passes through the conduit 57 to the piston of the operating device 11 of the clutch.

In the diagrammatic representation of the described constructional examples non-essential details, for instance, throttles for tuning the speed of action of the various pressure medium branches and the like, are not particularly indicated. Moreover there are provided controlled connections with the outer air, partly for the various conduit branches as far as these are not required at the time being, in order to let the previously used pressure escape rapidly. Non-essential modifications are also possible, inasmuch as the pressure indicated for the control of some function, or the pressure medium flowing in the corresponding conduit branch, may be brought into action not directly, but indirectly for pre-controlling a pressure medium admitted by another path.

I do not want to be limited to the details described or represented in the drawings as many variations will occur to those skilled in the art.

What I claim is:

1. In a motor driven vehicle in combination: a gear shift mechanism adapted to be operated by pressure, a first fluid pressure system adapted to operate said mechanism, a control valve in said system, a second fluid pressure system adapted to operate said valve, a control valve in said second system, lever means for actuating the control valve in the second system, and fluid pressure means other than the second fluid pressure system for holding open the control valve in the first fluid pressure system.

2. In a motor driven vehicle in combination: a gear shift mechanism adapted to be operated by pressure, a first fluid pressure system adapted to operate said gear shift mechanism, a clutch mechanism adapted to be operated by pressure, a second fluid pressure system adapted to operate said clutch mechanism, a control valve each in both of said pressure systems, a third fluid pressure system adapted to operate both said control valves, and a control valve in said third system, said latter control valve being adapted to be operated in dependency on the gas lever of the motor in said vehicle.

3. A combination as claimed in claim 2 further including a centrifugal governor driven in dependency on the motor speed, an additional pressure control valve in said second fluid pressure system, said latter valve being in operative connection with said centrifugal governor.

4. In a motor driven vehicle in combination, a gear shift mechanism adapted to be operated by pressure, a first fluid pressure system adapted to operate said mechanism, a control valve in said system, a second fluid pressure system adapted to operate said valve, a control valve in said second system controlling operation of the valve in the first system, and means for causing pressure from the first fluid pressure system to hold open the valve in said first system.

5. In a motor driven vehicle in combination, a gear shift mechanism adapted to be operated by pressure, a first fluid pressure system adapted to operate said gear shift mechanism, a clutch mechanism adapted to be operated by pressure, a second fluid pressure system adapted to operate said clutch mechanism, a control valve in each of said pressure systems, and pressure means operable to actuate the valves in the first and second systems.

6. In a motor driven vehicle in combination, a gear shift mechanism adapted to be operated by pressure, a first fluid pressure system adapted to operate said gear shift mechanism, a clutch mechanism adapted to be operated by pressure, a second fluid pressure system adapted to operate said clutch mechanism, a control valve in each of said pressure systems, and valve controlled pressure means for operating the control valves in the first system and the second system and adapted to be operated in accordance with the speed of the motor.

7. In a motor driven vehicle in combination, a gear shift mechanism adapted to be operated by pressure, a first fluid pressure system adapted to operate said mechanism, a control valve in said system, a second fluid pressure system adapted to operate said valve, a control valve in said second system, a third fluid pressure system adapted to operate the valve in said second system, and a control valve in the third system adapted to be operated in accordance with the speed of the motor in said vehicle.

8. In a motor driven vehicle in combination, a gear shift mechanism adapted to be operated by pressure, a first fluid pressure system adapted to operate said mechanism, a control valve in said system, a second fluid pressure system adapted to operate said valve, gear selector mechanism, a first valve in said second system operating in dependency on the gear selector mechanism, and a second valve in said second system adapted to be operated in accordance with the speed of the motor in said vehicle.

9. In a motor driven vehicle in combination, a gear shift mechanism adapted to be operated by pressure, gear selector mechanism, clutch mechanism adapted to be operated by pressure, pressure operated means operating in accordance with the speed of the motor in the vehicle for operating the clutch, and pressure operated means operating in dependency on both the gear selector mechanism and the clutch operating mechanism for operating the gear shift mechanism.

10. In a motor driven vehicle in combination, a gear shift mechanism adapted to be operated by pressure, a first fluid pressure system adapted to operate said mechanism, a control valve in said system, a second fluid pressure system adapted to operate said valve, a graduated control valve in the second system operating in accordance with the speed of the motor in the vehicle and serving to determine the time of operation of the control valve in the first system in accordance with the speed of the motor.

11. In a motor driven vehicle in combination, a gear shift mechanism adapted to be operated by pressure, a first fluid pressure system adapted to operate said gear shift mechanism, a clutch mechanism adapted to be operated by pressure, a second fluid pressure system adapted to operate said clutch mechanism, pressure means operating in accordance with the speed of the motor in said vehicle to operate the valves in both the first and second systems, and regulating means for varying the supply of pressure to the clutch mechanism.

12. In a motor driven vehicle in combination, a gear shift mechanism adapted to be operated by pressure, a first fluid pressure system adapted to operate said gear shift mechanism, a clutch mechanism adapted to be operated by pressure, a second fluid pressure system adapted to operate said clutch mechanism, a control valve in the first pressure system, a control valve in the second pressure system, a third fluid pressure system adapted to operate both said control valves, and a manually operated valve in the third pressure system.

13. In a motor driven vehicle in combination, a gear shift mechanism adapted to be operated by pressure, a first fluid pressure system adapted to operate said mechanism, a control valve in said system, a second fluid pressure system adapted to operate said valve, lever operated valve means in the second system, and further fluid pressure means for transmitting a pressure impulse to the control valve in the first system.

14. In a motor driven vehicle in combination, a gear shift mechanism adapted to be operated by pressure, a first fluid pressure system adapted to operate said mechanism, a control valve in said system, a second fluid pressure system adapted to operate said valve, lever operated valve means in the second system, and a fluid pressure line connecting with the first fluid pressure system for transmitting a pressure impulse to the control valve in the first system.

15. In a motor driven vehicle in combination, a gear shift mechanism adapted to be operated by pressure, a first fluid pressure system adapted to operate said mechanism, a control valve in said system, a second fluid pressure system adapted to operate said valve, lever operated valve means in the second system, a line connecting with the first fluid pressure system for transmitting a pressure impulse to the control valve in the first system, and a second line connecting with the first system for transmitting a pressure impulse to the valve in the first system.

16. In a motor driven vehicle in combination, a gear shift mechanism adapted to be operated by pressure, a first fluid pressure system adapted to operate said mechanism, a control valve in said system, a second fluid pressure system adapted to operate said valve, lever operated valve means in the second system, a fluid pressure line for causing pressure from the first system to act on the control valve in the first system, and a control valve in said line operating in dependency on the gear shift mechanism.

17. In a motor driven vehicle in combination, a gear shift mechanism adapted to be operated by pressure, a first fluid pressure system adapted to operate said mechanism, a clutch mechanism adapted to be operated by pressure, a second fluid pressure system adapted to operate said clutch mechanism, a control valve in each of said pressure systems, pressure means for operating the control valves in the first system and the second system, and lever actuated means controlling operating of said pressure means.

18. In a motor driven vehicle in combination, a gear shift mechanism adapted to be operated by pressure, a first fluid pressure system adapted to operate said mechanism, a clutch mechanism adapted to be operated by pressure, a second fluid pressure system adapted to operate said clutch mechanism, a control valve in each of said pressure systems, pressure supply means for actuating the valves in the first system and the second system, and manually operated valve means in said pressure supply means.

19. In a motor driven vehicle in combination, a gear shift mechanism adapted to be operated by pressure, a first fluid pressure system adapted to operate said mechanism, a control valve in said system, a second fluid pressure system adapted to operate said valve, a control valve in said second system, a third fluid pressure system adapted to operate the valve in said second system, and a manually operated control valve in the third system.

20. In a motor driven vehicle in combination, a gear shift mechanism adapted to be operated by pressure, a first fluid pressure system adapted to operate said mechanism, a control valve in said system, a second fluid pressure system adapted to operate said valve, gear selector mechanism, a first valve in said second system operating in dependency on the gear selector mechanism, lever means, and a second valve in said second system operating in dependency on said lever means.

21. In a motor driven vehicle in combination, a gear shift mechanism adapted to be operated by pressure, a first fluid pressure system adapted to operate said mechanism, a control valve in said first system, a second fluid pressure system for operating the valve in the first system, lever operated control means in the second system, a clutch mechanism adapted to be operated by pressure, a third fluid pressure system adapted to actuate the clutch mechanism, and means for causing pressure in the second system to act on the clutch mechanism.

22. In a motor driven vehicle in combination, a gear shift mechanism adapted to be operated by pressure, a clutch mechanism adapted to be operated by pressure, a first fluid pressure system adapted to operate the gear shift mechanism, a control valve in said first system, a second fluid pressure system adapted to actuate the control valve in the first system, a control valve in the second system, a third fluid pressure system adapted to actuate the clutch mechanism, a control valve in the third system, and lever means for operating the control valve in the second system and the third system.

KARL MAYBACH.